United States Patent
Kawarai

(10) Patent No.: US 9,257,891 B2
(45) Date of Patent: Feb. 9, 2016

(54) VIBRATION TYPE ELECTROMAGNETIC GENERATOR

(75) Inventor: Mitsugu Kawarai, Tokyo (JP)

(73) Assignee: SUMIDA CORPORATION (JP)

( * ) Notice: Subject to any disclaimer, the term of this patent is extended or adjusted under 35 U.S.C. 154(b) by 733 days.

(21) Appl. No.: 13/521,789

(22) PCT Filed: Aug. 27, 2010

(86) PCT No.: PCT/JP2010/064624
§ 371 (c)(1),
(2), (4) Date: Nov. 2, 2012

(87) PCT Pub. No.: WO2011/086726
PCT Pub. Date: Jul. 21, 2011

(65) Prior Publication Data
US 2013/0221768 A1    Aug. 29, 2013

(30) Foreign Application Priority Data
Jan. 14, 2010   (JP) ................................. 2010-006299

(51) Int. Cl.
 *H02K 35/02*  (2006.01)
(52) U.S. Cl.
 CPC ...................................... *H02K 35/02* (2013.01)
(58) Field of Classification Search
 None
 See application file for complete search history.

(56) References Cited

U.S. PATENT DOCUMENTS

| | | | |
|---|---|---|---|
| 6,043,572 A * | 3/2000 | Nagai et al. | ................. 310/12.25 |
| 8,115,350 B2 | 2/2012 | Yoshida et al. | |
| 2010/0084892 A1 | 4/2010 | Yoshida et al. | |
| 2012/0194008 A1 | 8/2012 | Iijima | |

FOREIGN PATENT DOCUMENTS

| | | |
|---|---|---|
| JP | 2006-296144 A | 10/2006 |
| JP | 2009-118581 A | 5/2009 |
| JP | 2009-213194 A | 9/2009 |
| WO | 2005031952 A1 | 4/2005 |
| WO | 2008/002414 A3 | 1/2008 |
| WO | 2008/139646 A1 | 11/2008 |

OTHER PUBLICATIONS

International Search Report for International Application No. PCT/JP2010/064624, mailed Nov. 16, 2010, with English translation.
Office Action for Japanese Patent Application 2010-006299, dated Oct. 22, 2013, with English translation.

* cited by examiner

*Primary Examiner* — Tran Nguyen
(74) *Attorney, Agent, or Firm* — Cantor Colburn LLP

(57) ABSTRACT

A vibration type electromagnetic generator is formed by a nonmagnetic material and includes a hollow first pipe whose both end portions are closed, a magneto coil which is wound around the periphery of the first pipe and which is provided with solenoid coils, and a movable magnet which is arranged inside the first pipe and which is movable along a winding axis direction of a magneto coil. Then, the movable magnet includes a plurality of magnets and a magnet fixing unit composed of a nonmagnetic body for fixing the plurality of magnets whose same magnetic poles are facing one another, and among the plurality of solenoid coils, the coil length of one or more solenoid coils are made to be length equal to or greater than the magnet length of the magnet.

4 Claims, 17 Drawing Sheets

COIL PITCH L=1.05a~1.50a

VIBRATION TYPE ELECTROMAGNETIC GENERATOR

CROSS REFERENCE TO RELATED APPLICATIONS

This is a U.S. national stage of application No. PCT/JP2010/064624, filed on 27 Aug. 2010. Priority under 35 U.S.C. §119(a) and 35 U.S.C. §365(b) is claimed from Japanese Application No. 2010-006299, filed 14 Jan. 2010, the disclosure of which are also incorporated herein by reference.

TECHNICAL FIELD

The present invention relates to a vibration type electromagnetic generator which generates electric power, for example, by a mechanism in which a movable magnet including a plurality of magnets magnetized in the lengthwise direction vibrates or moves inside a magneto coil constituted by one or more solenoid coils.

BACKGROUND ART

In recent years, mobile electronic equipment such as mobile-phones, game machines or the like has become popular and the quantities of secondary batteries installed therein have become larger and larger. Also, along with the development in wireless communication technology, there has been spreading of application of RFID (Radio Frequency Identification) which transmits & receives signals by very small power. In particular, it is possible for active RFID having power supply to achieve communication of several hundred meters or more. Thus, there are increasing hopes for application thereof to the health management of cows, horses or the like on farms, to the safety management of children when going to school and/or coming out of school, or the like.

On the other hand, for the sake of the maintenance and improvement of global environment, there have been actively carried out research and development of batteries having as little environmental loads as possible. Among those above, there has been broadly considered an idea that energy which is usually consumed unconsciously and also uselessly is converted to electric energy and used for charging, and this electric energy is utilized as power supply for mobile devices or the like.

In Patent Document 1, there is disclosed a vibration type electromagnetic generator which generates electricity by vibration applied from the outside.

FIG. 23 shows a constitution example of a vibration type electromagnetic generator 100.

The vibration type electromagnetic generator 100 is provided with a hollow pipe 105, two solenoid coils 104a, 104b wound around the pipe 105, and a movable magnet 101 which is movable inside the pipe 105. The movable magnet 101 is provided with two magnets 102a, 102b. The magnets 102a, 102b are joined through a spacer 103 made of a nonmagnetic body in a state in which the same magnetic poles thereof are faced to each other. When vibration is applied to the vibration type electromagnetic generator 100, the movable magnet 101 vibrates in a reciprocating manner in the winding axis direction of the solenoid coils 104a, 104b and electricity is generated.

It should be noted in the explanation below that there is also a case in which the solenoid coil is referred to as "coil" for short.

PRIOR-ART DOCUMENT

Patent Document

Patent Document 1: Japanese unexamined PCT patent publication No. 2007-521785

DISCLOSURE OF THE INVENTION

Problem to be Solved by the Invention

The vibration type electromagnetic generator 100 in the past has such an advantage that although the size thereof is small, the power generation efficiency thereof is high. In order to heighten the power generation efficiency, it is necessary to use a magnet represented by an Nd (neodymium) magnet or the like which has a large energy product. However, when the same magnetic poles of the magnets 102a, 102b are made to face and approach each other, there occurs a phenomenon in which their mutual repulsive forces become large. Thus, merely using a usual manufacturing method or structure made it difficult to support and fix the magnets 102a, 102b sufficiently.

Also, by a mechanism in which a plurality of magnets, whose same magnetic poles are facing each other, reciprocate inside a plurality of adjacent coils, electromotive forces are generated in the coils. However, there is a timing at which the respective outputs of the plurality of coils cancel one another out due to phase deviation, and this has been the main cause of large reduction in the output of the power generator.

The present invention was invented in view of such a situation and is addressed to provide a vibration type electromagnetic generator which has a high electromotive force although the constitution thereof is simple and also, the assembly thereof is easy.

Means for Solving the Problem

A vibration type electromagnetic generator of the present invention includes a hollow first pipe which is formed by a nonmagnetic material and whose both end portions are closed, a magneto coil which is wound around the periphery of the first pipe and which is provided with at least one solenoid coil, and a movable magnet which is arranged inside the first pipe and which is movable along the winding axis direction of the magneto coil. The movable magnet includes a plurality of magnets and a magnet fixing unit composed of a nonmagnetic body for fixing the plurality of magnets whose same magnetic poles are facing each other. Then, the coil length of one or more of the solenoid coils among the plurality of solenoid coil is made to be a length equal to or greater than the magnet length of the magnet.

Effect of the Invention

According to the present invention, by setting the coil length of one or more solenoid coils to be equal to or greater than the magnet length of the magnet, it is possible to enlarge the range in which the magnetic field generated by the magnet passes through the solenoid coils and to make the phases of the voltages outputted by the solenoid coils coincide with one another. Thus, there is obtained such an effect that it is possible to heighten the output voltage of the vibration type electromagnetic generator. Also, the constitution of the vibration type electromagnetic generator is made extremely simple, so that the assembly thereof becomes easy.

BRIEF DESCRIPTION OF DRAWINGS

FIG. 7 is an explanatory diagram showing an example of voltage waveforms outputted by three solenoid coils which a vibration type electromagnetic generator in the past is provided with;

FIG. 14 is a cross-sectional view showing a constitution example (comparative example 2) of four solenoid coils and two magnets which a vibration type electromagnetic generator in the past is provided with;

FIG. 15 is a cross-sectional view showing a constitution example (inventive example 4) of four solenoid coils and two magnets which a vibration type electromagnetic generator relating to the second exemplified embodiment of the present invention is provided with;

FIG. 17 is a cross-sectional view showing a constitution example (comparative example 3) of four solenoid coils and three magnets which a vibration type electromagnetic generator in the past is provided with;

FIG. 18 is a cross-sectional view showing a constitution example (inventive example 5) of four solenoid coils and three magnets which a vibration type electromagnetic generator relating to the third exemplified embodiment of the present invention is provided with;

FIG. 19 is a cross-sectional view showing a constitution example (inventive example 6) of four solenoid coils and three magnets which a vibration type electromagnetic generator relating to the third exemplified embodiment of the present invention is provided with;

MODE FOR CARRYING OUT THE INVENTION

Hereinafter, there will be explained a first exemplified embodiment example of the present invention with reference to FIGS. 1 to 12. This exemplified embodiment is an example applied to a vibration type electromagnetic generator 1 which generates electricity by vibrating or moving a plurality of cylindrical magnets, which are magnetized in the lengthwise directions thereof, in a plurality of solenoid coils.

First Exemplified Embodiment

Figure 1:
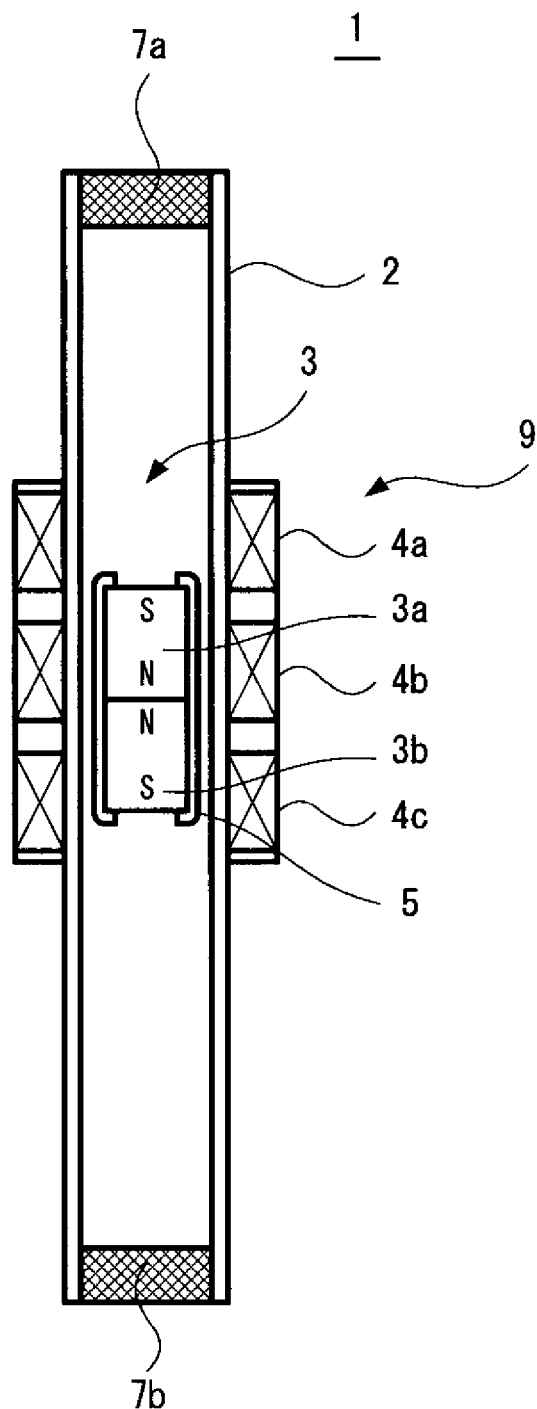
FIG. 1 is a cross-sectional view showing a constitution example of a vibration type electromagnetic generator relating to a first exemplified embodiment of the present invention.

FIG. 1 is a cross-sectional view showing a constitution example of the vibration type electromagnetic generator 1 of this embodiment.

The vibration type electromagnetic generator 1 is constituted by a movable magnet 3 arranged movably inside a first pipe 2, and solenoid coils 4a to 4c. The solenoid coils 4a to 4c are wound around the outer circumference of the hollow first pipe 2. The first pipe 2 is formed by a nonmagnetic material. It is allowed for the material of the first pipe 2 to be a nonmagnetic material such as metal or the like, but it is desirable to manufacture the pipe by a synthetic resin such as plastic or the like in view of workability or the like. When the movable magnet 3 moves inside the first pipe 2 in a linear reciprocating manner (Hereinafter, this movement is also referred to as vibration simply), the solenoid coils 4a to 4c generate voltage.

The movable magnet 3 is provided with a hollow second pipe 5 formed by a nonmagnetic material, and inside the second pipe 5 there are sealed a plurality of magnets (for example, neodymium magnets) which are joined in such a manner that the same polarities face each other. Magnets 3a, 3b having the same length which are magnetized in the lengthwise direction are joined integrally in such a manner that the same magnetic poles face each other. However, it is allowed to join the magnets 3a, 3b through a spacer by using either a magnetic body or a nonmagnetic body therebetween. Also, it is desirable for the movable magnet 3 to be provided with a plurality of magnets. In a state of being inserted inside the second pipe 5, the magnets 3a, 3b are sealed inside the second pipe 5 by a caulking process applied to both ends of the second pipe 5. Thus, the second pipe 5 is used as a magnet fixing unit for fixing the plurality of magnets.

It should be noted in the explanation below that a phenomenon in which, when the inner wall surface of the first pipe 2 and the movable magnet 3 move relatively in a state of physical contact, force acts in such a direction that their respective motions are disturbed by each other is defined as "friction". The friction is generated by wobbling which occurs when the movable magnet 3 vibrates and a resultant increase in the number of contact places and/or collisions between the inner wall surface of the first pipe 2 and the movable magnet 3, and this may become a factor of attenuation of the vibration of the movable magnet 3.

For such a reason, it is desirable to use a low friction coefficient material such as polypropylene (PP: polypropylene) or the like for at least one of or both of the first pipe 2 and the second pipe 5. By using such a material, it is possible to reduce the friction between the inner wall surface of the first pipe 2 and the movable magnet 3.

The solenoid coils 4a to 4c are a plurality of coils connected in series by opposite polarities and are wound around the periphery of the first pipe 2 in a state of being spaced with predetermined intervals. The winding directions of the respective solenoid coils are mutually reversed directions for every two adjacent solenoid coils, that is, forward & reverse & forward directions. In the explanation below, the solenoid coils 4a to 4c connected in series are referred to as a magneto coil 9. For the first pipe 2, there is provided at least one solenoid coil as the magneto coil 9.

To both end portions of the first pipe 2, end portion members 7a, 7b formed by resin or the like are fitted in order to prevent the movable magnet 3 from exiting, and both the end portions of the first pipe 2 are closed by the end portion members 7a, 7b. The end portion members 7a, 7b have the same shapes, but it is allowed to form these end portion members to have mutually different shapes. In this manner, in the vibration type electromagnetic generator 1, there is created a situation in which the movable magnet 3 is vibratable in the winding axis direction of the magneto coil 9. Then, when an operator vibrates the vibration type electromagnetic generator 1, the movable magnet 3 vibrates inside the magneto coil 9, voltage is induced in the solenoid coils 4a to 4c, and an electromotive force occurs.

Then, by setting the phases of the voltages which the solenoid coils 4a to 4c generate to coincide with one another and by synthesizing them, the voltage which the vibration type electromagnetic generator 1 outputs is to be increased. For that purpose, it is necessary to adjust the magnet length and the coil length or to adjust the magnet length and the length which is the sum of the coil length and the coil space. Hereinafter, the coil length or the length which is the sum of the coil length and the coil space is referred to also as "coil pitch".

In this embodiment, the coil length of one or more solenoid coils among the plurality of solenoid coils 4a to 4c included in the vibration type electromagnetic generator 1 is made to be a length equal to or greater than the magnet length of the magnet. There will be a description later about a condition set between the magnet length and the coil pitch.

Next, with reference to FIGS. 2 to 8, there will be explained a constitution example of the movable magnet and the coils in a case in which the long-axis size of the magnet is changed. Here, in FIG. 2 and FIGS. 4 to 6, the drawings are shown with the omission of the second pipe from the constitution of the vibration type electromagnetic generator.

Figure 2:
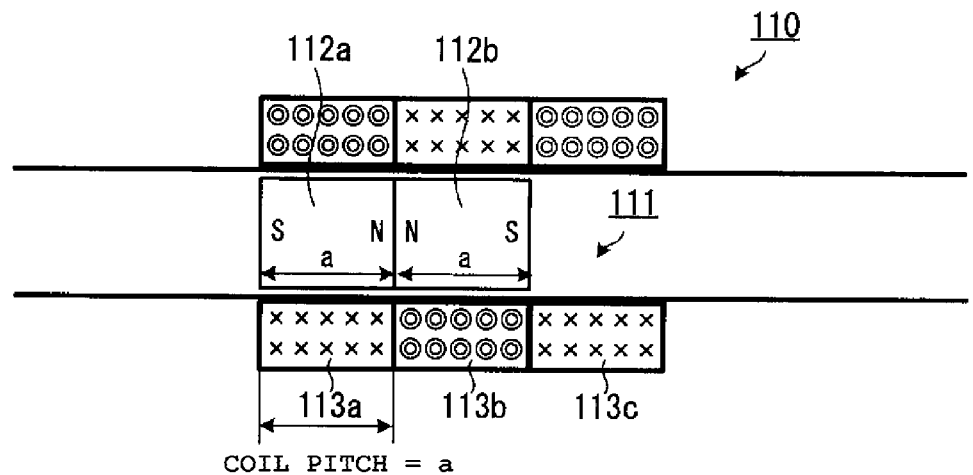
FIG. 2 is a cross-sectional view showing a constitution example (comparative example 1) of three solenoid coils and two magnets which are included in a vibration type electromagnetic generator in the past.

FIG. 2 shows a constitution example of a vibration type electromagnetic generator 110 in the past provided with three solenoid coils and two magnets. Hereinafter, the vibration type electromagnetic generator 110 formed to have such a constitution is referred to also as "comparative example 1".

The vibration type electromagnetic generator 110 in the past is provided with a movable magnet 111 composed of two magnets 112a, 112b connected with each other, and three solenoid coils 113a to 113c. The length $L$ of each of the solenoid coils 113a to 113c in the winding axis direction is equal to the length $a$ of the magnets 112a, 112b in the long-axis direction.

In the past, in the vibration type electromagnetic generator 110 in which the same magnetic poles were faced to each other, the magnets 112a, 112b and the solenoid coils 113a to 113c were made to have the following constitutions.

(1) A magnet unit is constituted by a plurality of magnets in which the same magnetic poles thereof are faced to one another and are closely attached to one another without gaps. (Magnetization is carried out in the long-axis direction of the magnets.)

(2) A plurality of coils are constituted by setting the winding directions of adjacent coils in a reversed manner, making the coil axes coincide with one another, and connecting the coils in series.

(3) The long-axis size of one magnet is made equal to the coil pitch of a plurality of coils in the winding axis direction.

Fundamentally, by making the constitution of the magnets and the coils conform to the conditions of the above-mentioned (1) to (3), the timings at which the respective magnets pass through the respective coils coincide with one another. At that time, it is conceivable that since the output waveforms of the voltages which the respective coils generate by the passage of the magnets through the insides of the coils are equal in phase, the voltages outputted by the respective coils are added together and a large voltage can be outputted. However, the electric power generation output obtained in the vibration type electromagnetic generator 110 which employed a constitution in the past was small.

Here, when the vibration type electromagnetic generator 110 was manufactured by way of trial and the outputs of the respective coils were measured, it was found out that phase deviations occur and the coils mutually cancel out the electric power generation outputs at the timing when the output waveform is reversed from "+" to "−" or from "−" to "+". It is supposed that the cause thereof is that there is a difference between the magnetic flux distribution at the portion where the same magnetic poles are facing each other and the magnetic flux distribution of the magnets which are arranged at both end portions of the movable magnet 111 and whose same magnetic poles are not facing each other.

Here, there will be explained a magnetic flux distribution which occurs in case of linking a plurality of magnets whose same magnetic poles are facing one another.

Figure 3A:
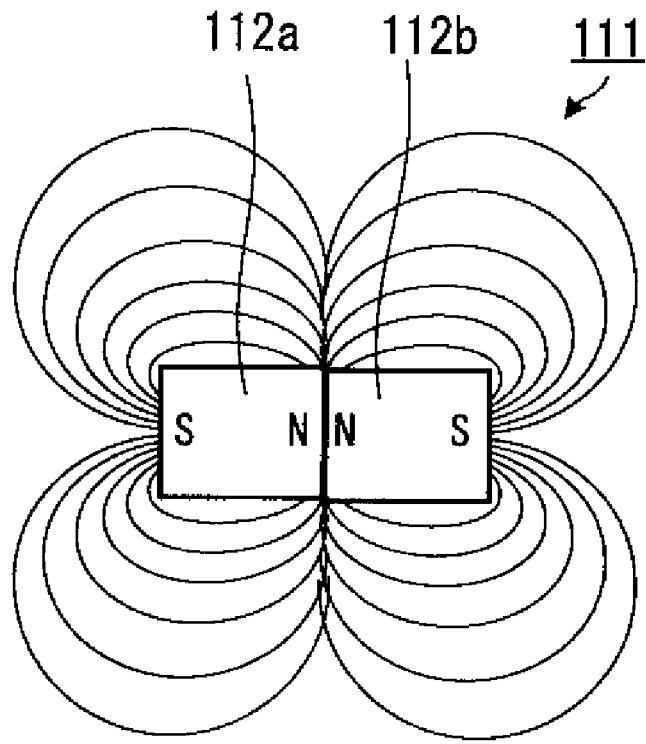
FIGS. 3A and 3B are explanatory diagrams showing aspects of magnetic-flux distributions which are generated from two or three magnets.
Figure 3B:
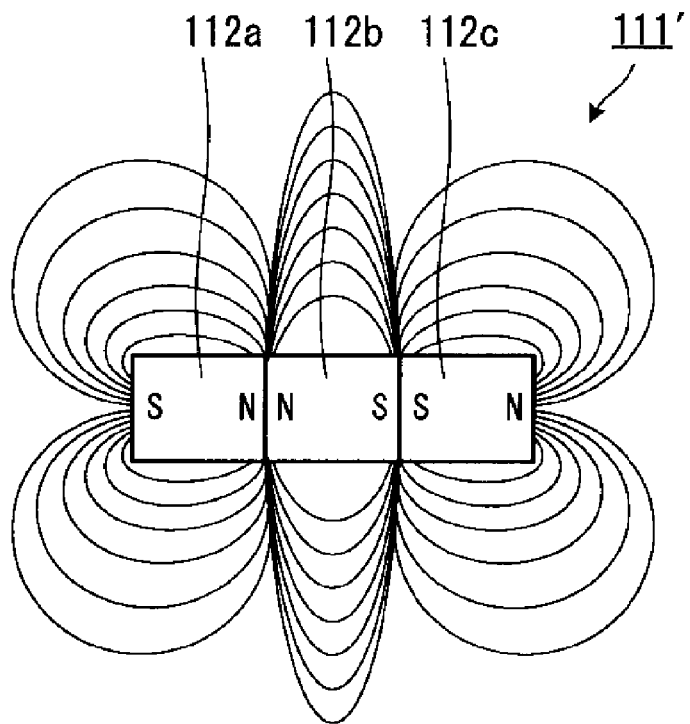

FIGS. 3A and 3B show aspects of magnetic flux distributions which occur from three magnets 112a to 112c.

FIG. 3A shows an aspect of a magnetic flux distribution in case of linking two magnets 112a, 112b.

The magnets 112a, 112b repel each other when the same magnetic poles thereof face each other. At that time, the magnetic flux distributions at both end portions of the movable magnet 111 and at a central portion thereof are different. Specifically, the magnetic flux at the central portion of the movable magnet 111 has a higher density than that of the magnetic flux at both the end portions of the movable magnet 111. Thus, in the vibration type electromagnetic generator 110 in the past, it is not possible to utilize the magnetic flux generated by the movable magnet 111 effectively and the voltage outputted by the solenoid coils 113a to 113c is low.

FIG. 3B shows an aspect of a magnetic flux distribution in case of linking three magnets 112a to 112c.

Here, as a modified example of the movable magnet 111, there is cited an example of a movable magnet 111' which has three magnets 112a to 112c. As mentioned above, the magnets 112a to 112c repel one another when the respective same magnetic poles face one another. At that time, regarding the magnetic flux distribution, the magnet 112b arranged in the center has a high magnetic flux density in the direction perpendicular to the long-axis direction of the magnets 112a to 112c compared with the magnets 112a, 112c arranged at both ends of the movable magnet 111'. Thus, unless the length of the solenoid coil is changed such that as many magnetic fluxes as those generated by the magnet 112b pass therethrough, there occurs a phase deviation in the output voltage of each coil.

Consequently, in the vibration type electromagnetic generator 1, the magnet length and the coil length are set in conformity with the following condition (A).

(A) The pitch of a plurality of coils is made to be a length between 1.05 times or more and 1.50 times or less, preferably between 1.10 times or more and 1.4 times or less, the long-axis size of one magnet.

When the vibration type electromagnetic generator 1 is constituted in this manner, the phase difference in the output voltages between the coils is corrected. Thus, it was found out by experiment that it was possible to drastically reduce the timings at which voltage waveforms cancel one another out and it was possible to improve the voltage output of the vibration type electromagnetic generator 1 compared with the vibration type electromagnetic generator 110 of the comparative example 1. Hereinafter, comparisons are made regarding the constitutions and the output voltages between the vibration type electromagnetic generator 110 in the past and the vibration type electromagnetic generator 1 relating to this exemplified embodiment.

Figure 4:
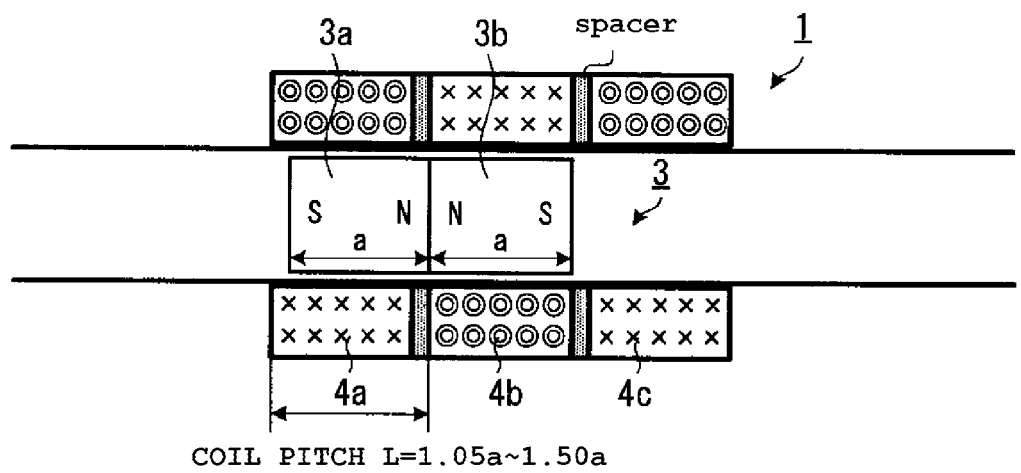
FIG. 4 is a cross-sectional view showing a constitution example (inventive example 1) of three solenoid coils and two magnets which are included in a vibration type electromagnetic generator relating to a first exemplified embodiment of the present invention.

FIG. 4 shows a constitution example of the vibration type electromagnetic generator 1 relating to the present invention, which is provided with three solenoid coils and two magnets. Hereinafter, the vibration type electromagnetic generator 1 made to have such a constitution will be referred to also as "inventive example 1".

The vibration type electromagnetic generator 1 relating to the inventive example 1 is provided, as mentioned above, with a movable magnet 3 composed of two magnets 3a, 3b and with three solenoid coils 4a to 4c. However, for comparison of power generation efficiency with the comparative example 1 which will be mentioned later, there is employed a constitution in which a spacer intervenes between each adjacent two of the solenoid coils 4a to 4c. Then, in case of expressing the coil pitch as $L$ and expressing the magnet length as $a$, a relation of $1.05a \leq L \leq 1.50a$ is to be satisfied.

Figure 5:
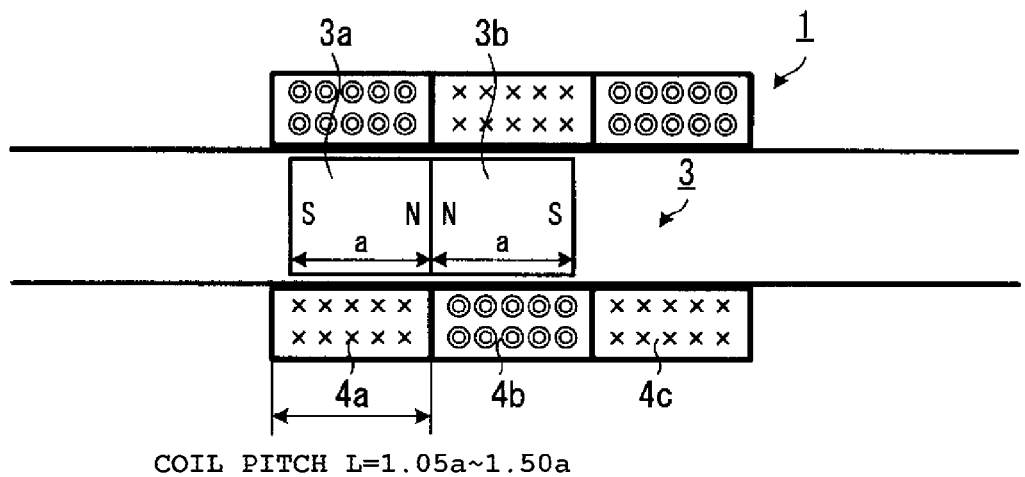
FIG. 5 is a cross-sectional view showing a constitution example (inventive example 2) of three solenoid coils and two magnets which are included in a vibration type electromagnetic generator relating to the first exemplified embodiment of the present invention.

FIG. 5 shows a constitution example of the vibration type electromagnetic generator 1 relating to the present invention, which is provided with three solenoid coils and two magnets. Hereinafter, the vibration type electromagnetic generator 1 made to have such a constitution will be referred to also as "inventive example 2".

The vibration type electromagnetic generator 1 relating to the inventive example 2 is made to have a constitution which does not include a spacer between each adjacent two of the solenoid coils 4a to 4c. Then, in case of expressing the coil pitch as $L$ and expressing the magnet length as $a$, a relation of $1.05a \leq L \leq 1.50a$ is to be satisfied.

Figure 6:
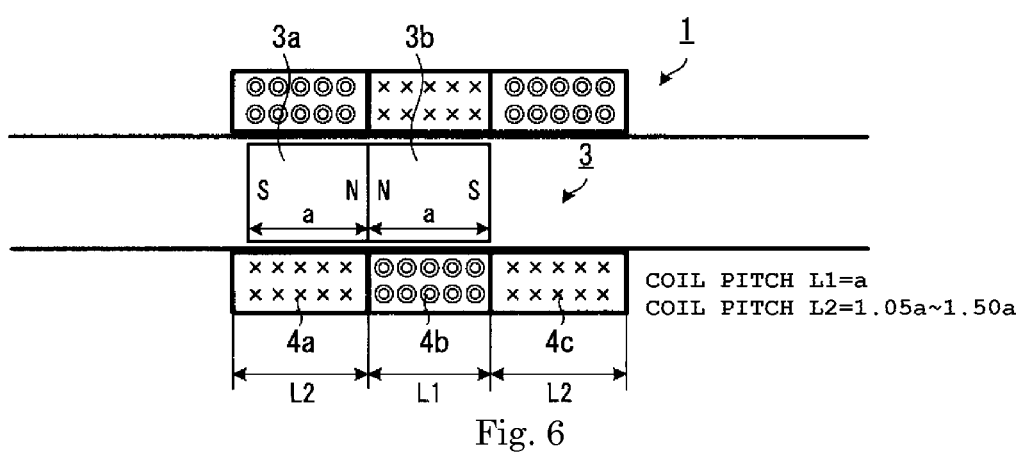
FIG. 6 is a cross-sectional view showing a constitution example (inventive example 3) of three solenoid coils and two magnets which are included in a vibration type electromagnetic generator relating to the first exemplified embodiment of the present invention.

FIG. 6 shows a constitution example of the vibration type electromagnetic generator 1 relating to the present invention, which is provided with three solenoid coils and two magnets. Hereinafter, the vibration type electromagnetic generator 1 made to have such a constitution will be referred to also as "inventive example 3".

The vibration type electromagnetic generator 1 relating to the inventive example 3 is made to have a constitution which does not include a spacer between each adjacent two of the solenoid coils 4a to 4c. Then, in case of expressing the coil pitch of the solenoid coil 4b as L1, expressing the coil pitch of the solenoid coils 4a, 4c as L2 and expressing the magnet length as $a$, relations of L1=a and $1.05a \leq L2 \leq 1.50a$ are to be satisfied.

Next, there will be explained voltage waveforms which the respective coils output by citing, as examples, the vibration type electromagnetic generator 110 in the past, indicated as the comparative example 1, and the vibration type electromagnetic generator 1, indicated as the inventive example 1.

Figure 7:
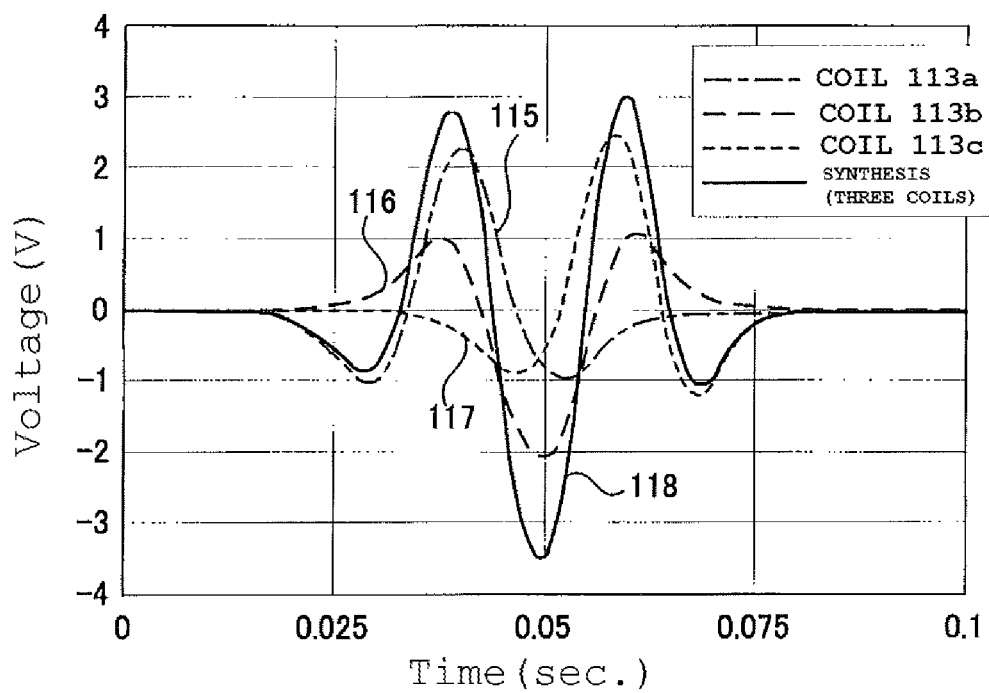

FIG. 7 shows an example of voltage waveforms outputted by the solenoid coils 113a to 113c with which the vibration type electromagnetic generator 110 in the past is provided.

In this graph, the voltage waveforms outputted by the solenoid coils 113a to 113c are indicated as voltage waveforms 115 to 117 respectively. Then, the voltage waveform obtained by synthesizing the voltages outputted by the solenoid coils 113a to 113c is indicated as a voltage waveform 118.

From the voltage waveform 118, it is understood that a voltage of ±3V is outputted by the vibration type electromagnetic generator 110.

Figure 8:
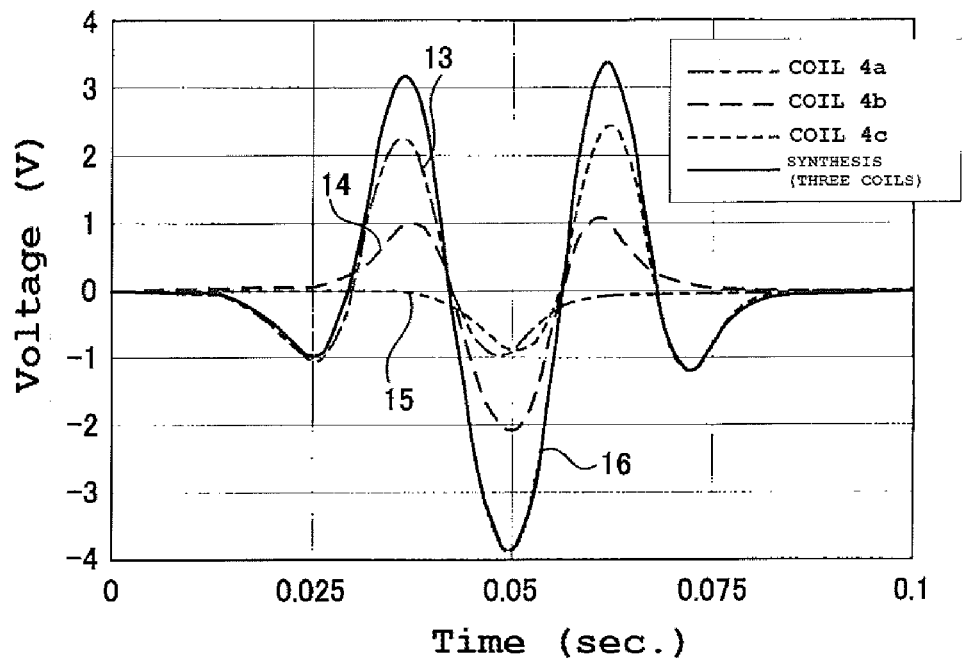
FIG. 8 is an explanatory diagram showing an example of voltage waveforms outputted by three solenoid coils which a vibration type electromagnetic generator relating to the first exemplified embodiment of the present invention.

FIG. 8 shows an example of voltage waveforms outputted by the solenoid coils 4a to 4c included in the vibration type electromagnetic generator 1 indicated as the inventive example 1.

In this graph, the voltage waveforms outputted by the solenoid coils 4a to 4c are indicated as voltage waveforms 13 to respectively. Then, the voltage waveform obtained by synthesizing the voltages outputted by the solenoid coils 4a to 4c is indicated as a voltage waveform 16. From the voltage waveform 16, it is understood that a voltage of ±4V is outputted by the vibration type electromagnetic generator 1.

Further, in order to find the most suitable coil pitch for the vibration type electromagnetic generator 1 shown in the inventive example 1 in comparison with the vibration type electromagnetic generator 110 relating to the comparative example 1, the inventor measured voltage values outputted for coil pitch ratios (coil length/long-axis size of magnet) of nine patterns. Then, in a case in which the effective value of the voltage outputted by the vibration type electromagnetic generator 110 shown in the comparative example 1 was set as a reference value, the ratio between the effective values of the voltages outputted by the vibration type electromagnetic generator 1 whose coil pitch ratio was changed according to the patterns was worked out as the effective value output voltage mark-up percentage. This measurement result is shown in Table 1.

TABLE 1

| Examples | Coil Pitch Ratio: Coil Length/Size of Magnet Length | Effective Value Output Voltage Mark-up Percentage | Judgment |
| --- | --- | --- | --- |
| Comparative Example 1 | 1.00 | 0.0% | — |
| Inventive example 1-1 | 1.03 | 3.5% | Δ |
| Inventive example 1-2 | 1.05 | 8.1% | ○ |
| Inventive example 1-3 | 1.10 | 16.8% | ○ |

TABLE 1-continued

| Examples | Coil Pitch Ratio: Coil Length/Size of Magnet Length | Effective Value Output Voltage Mark-up Percentage | Judgment |
|---|---|---|---|
| Inventive example 1-4 | 1.30 | 24.3% | ○ |
| Inventive example 1-5 | 1.40 | 12.8% | ○ |
| Inventive example 1-6 | 1.50 | 5.8% | ○ |
| Inventive example 1-7 | 1.55 | 2.9% | Δ |
| Inventive example 1-8 | 1.60 | −6.6% | X |
| Inventive example 1-9 | 1.70 | −17.4% | X |

As shown in Table 1, in cases in which the coil pitch ratios are set in the range of 1.03 to 1.55, increase in the effective values of the voltages outputted by the vibration type electromagnetic generator 1 is shown. Here, in a case in which the effective value output voltage mark-up percentage is within the range of 0% to 5.0%, the judgment result is shown by "Δ" and in a case in which the effective value output voltage mark-up percentage is 5.0% or more, the judgment result is shown by "o". Thus, if the coil pitch ratio is set within the range of 1.05 to 1.50 desirably, the vibration type electromagnetic generator 1 outputs a high voltage.

Similarly, in order to find out the most suitable coil pitches for the vibration type electromagnetic generator 1 relating to the inventive examples 2 and 3, the inventor measured the voltage values outputted for coil pitch ratios of five patterns.

TABLE 2

| Examples | Coil Pitch Ratio: Coil Length/Size of Magnet Length | Effective Value Output Voltage Mark-up Percentage | Judgment |
|---|---|---|---|
| Comparative Example 1 | 1.00 | 0.0% | — |
| Inventive example 2-1 | 1.05 | 9.4% | ○ |
| Inventive example 2-2 | 1.30 | 28.2% | ○ |
| Inventive example 2-3 | 1.40 | 17.9% | ○ |
| Inventive example 2-4 | 1.50 | 5.9% | ○ |
| Inventive example 2-5 | 1.60 | −4.3% | X |

TABLE 3

| Examples | Coil Pitch Ratio: Coil Length/Size of Magnet Length | Effective Value Output Voltage Mark-up Percentage | Judgment |
|---|---|---|---|
| Comparative Example 1 | 1.00 | 0.0% | — |
| Inventive example 3-1 | 1.05 | 6.6% | ○ |
| Inventive example 3-2 | 1.30 | 20.8% | ○ |
| Inventive example 3-3 | 1.40 | 14.8% | ○ |
| Inventive example 3-4 | 1.50 | 5.0% | ○ |
| Inventive example 3-5 | 1.60 | −8.0% | X |

As shown in Table 2 and Table 3, even in the vibration type electromagnetic generator 1 relating to the inventive examples 2 and 3, increase in the effective values of the voltages outputted by the vibration type electromagnetic generator 1 is shown in case of setting the coil pitch ratios in the range of 1.05 to 1.50.

Next, with reference to FIG. 9 to FIG. 11, there will be explained a constitution example of a movable magnet assembling apparatus 20 for assembling the movable magnet 3, and an example of a manufacturing method of the movable magnet 3, which is accomplished by using the movable magnet assembling apparatus 20.

The movable magnet 3 is provided with the magnets 3a, 3b having strong magnetic force, so that the electromotive force generated by the magneto coil 9 of the vibration type electromagnetic generator 1 increases as compared with a case in which magnets having weak magnetic force are used. However, when the same magnetic poles of the respective magnets are made to face each other without a spacer being sandwiched therebetween, the facing magnets repel each other strongly. Thus, special devising is required for the manufacturing method of the movable magnet 3.

Figure 9:
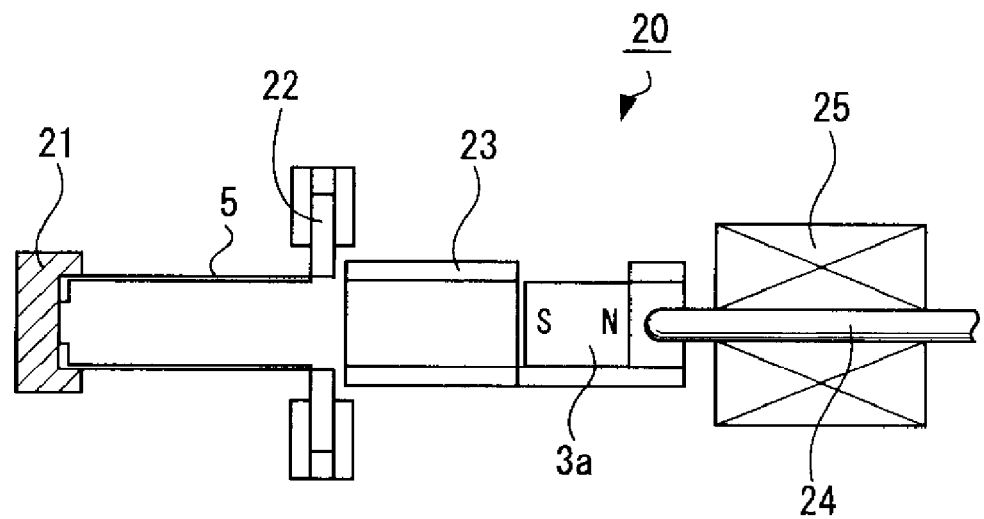
FIG. 9 is a cross-sectional view showing an example of a state in which a magnet is set in a movable magnet assembling apparatus relating to the first exemplified embodiment of the present invention.

FIG. 9 shows an example of a state in which the magnet 3a is set in the movable magnet assembling apparatus 20.

The movable magnet assembling apparatus 20 is provided with a positioning stopper portion 21 for holding the second pipe 5 according to the length thereof, an exit stopper 22 for stopping the magnet so as not to exit from the second pipe 5, a magnet guide 23 having an insertion port for inserting the magnet straight into the inside of the second pipe 5, a press rod 24 for pressing the magnet into the second pipe 5, and a press rod control apparatus 25 for controlling the pressing of the press rod 24.

One end portion of the second pipe 5 is fixed to the positioning stopper portion 21 beforehand, previously subjected to a caulking process for the fixation. Then, the magnet 3a is set in the magnet guide 23.

Figure 10:
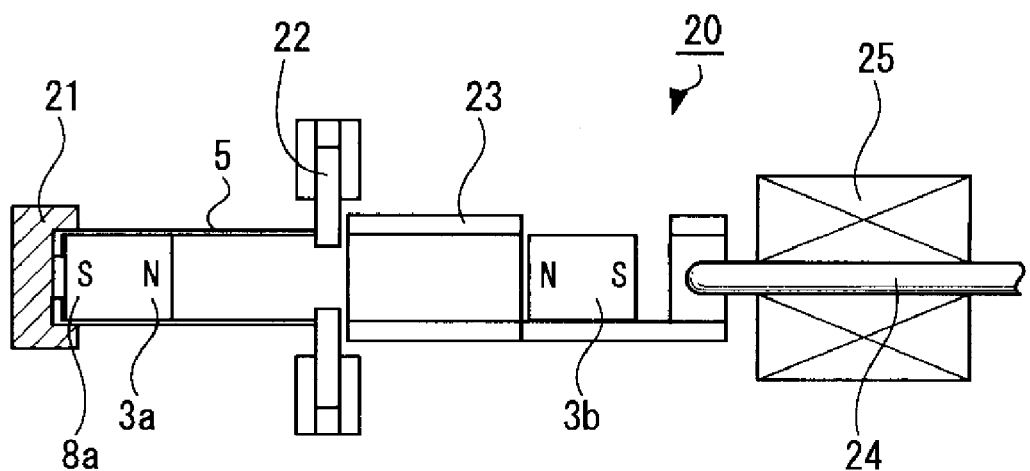
FIG. 10 is a cross-sectional view showing an example of a state in which two magnets are set in a movable magnet assembling apparatus relating to the first exemplified embodiment of the present invention.

FIG. 10 shows an example of a state in which the magnet 3b has been set in the movable magnet assembling apparatus 20 after pressing the set magnet 3a into the second pipe 5 by the press rod 24.

Figure 11:
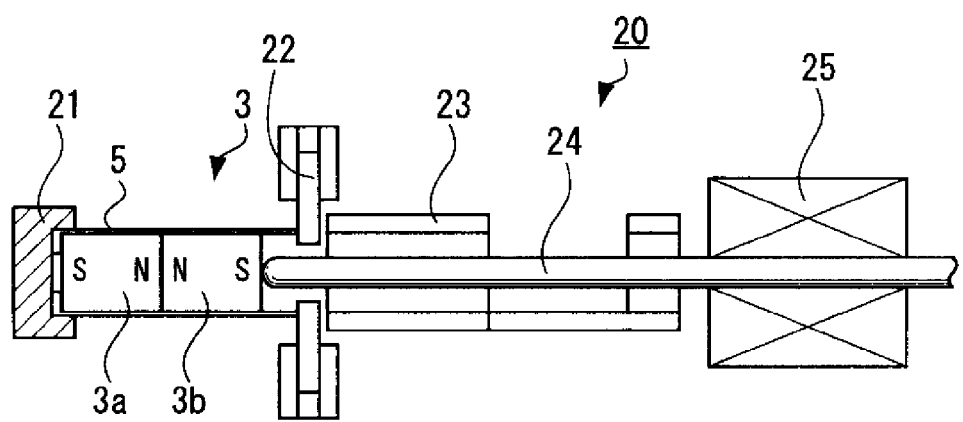
FIG. 11 is a cross-sectional view showing an example of a state in which the two magnets set in the movable magnet assembling apparatus relating to the first exemplified embodiment of the present invention are pressed into a second pipe.

FIG. 11 shows an example of a state in which the magnet 3b has been pressed into the second pipe 5.

The magnet 3a is pressed into the back of the second pipe 5 and the N-pole of the magnet 3a faces the magnet 3b. On the other hand, the magnet 3b is inserted in the second pipe 5 in a state in which the N-pole of the magnet 3b faces the magnet 3a. In this manner, the same magnetic poles of the magnets 3a, 3b face each other, so that the magnets 3a, 3b mutually have repulsive forces generated. Due to these repulsive forces, the magnet 3b is feared to exit from the second pipe 5.

Consequently, when the magnet 3b is completely inserted into the second pipe 5, the exit stopper 22 moves. The exit stopper 22 moves as far as a position where the diameter is narrower than the inner diameter of the second pipe 5, and stops the magnet 3b which looks as if to exit from the second pipe 5.

Thus, even if the press rod 24 gets away, the magnet 3b is held inside the second pipe 5 by the exit stopper 22.

Consequently, the magnet 3b does not exit from the second pipe 5 even if the press rod 24 gets away from the magnet 3b. Then, the overlapping portion of the second pipe 5 and the magnet 3b can be caulked or fixed & sealed by thermal fusion or adhesion with the use of a heating tool (not shown).

Also, the movable magnet 3 is joined integrally by caulking both end portions of the second pipe 5, so that even if shock is applied, decomposition does not easily happen. Further, it is allowed to bond and fix the second pipe 5 and the magnets 3a, 3b together by applying an adhesive agent to the inner wall surface of the second pipe 5. For the adhesive agent used at that time, it is needless to say that an adhesive agent is selected which has a sufficiently strong adhesive force with respect to the resin used.

In case of forming a movable magnet including three or more magnets, as shown in FIG. 9 to FIG. 11, it is enough if the magnets are set in the movable magnet assembling apparatus 20 and processes for pressing them into the second pipe 5 are repeated. Also, as shown in FIG. 1, the second pipe 5 is made to have a constitution in which both end portions thereof are closed by a caulking process, but it is allowed to employ a constitution in which either one of the end portions is closed by a caulking process. At that time, it is allowed for the second pipe 5 to have a constitution having a bottomed cylindrical shape.

Figure 12A:
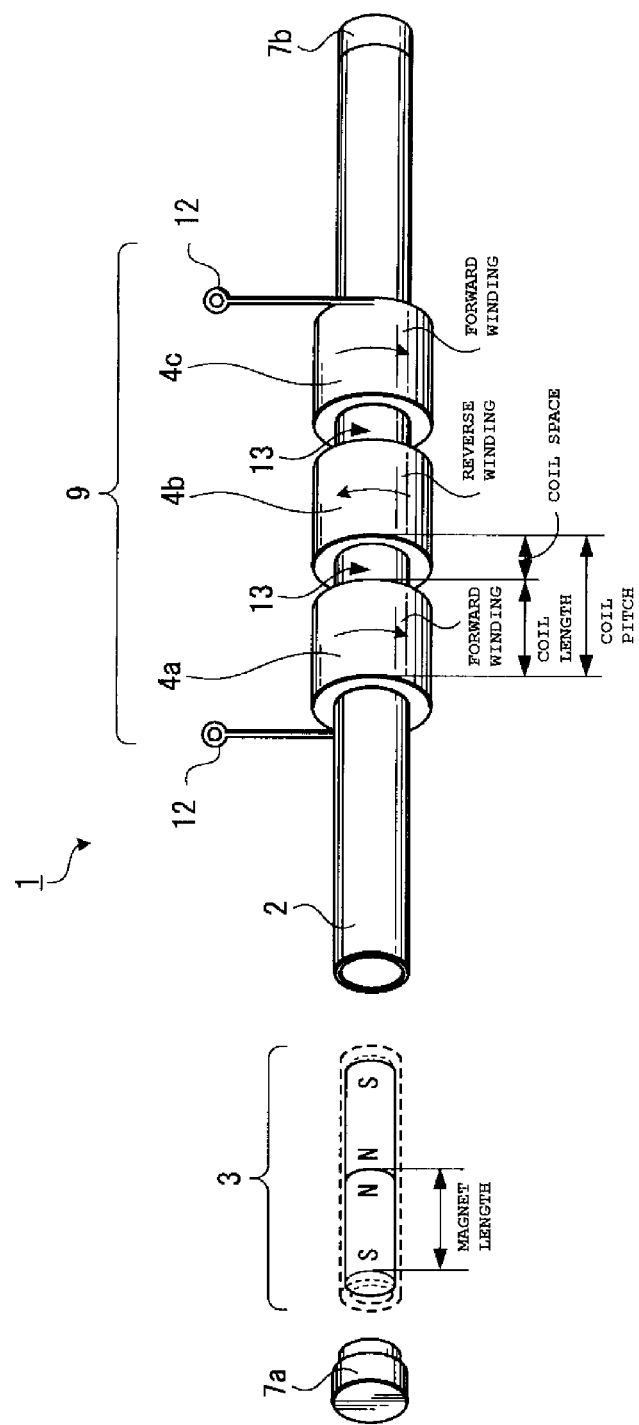
FIGS. 12A and 12B are exterior perspective views showing a constitution example of the vibration type electromagnetic generator of the first exemplified embodiment relating to the present invention.
Figure 12B:
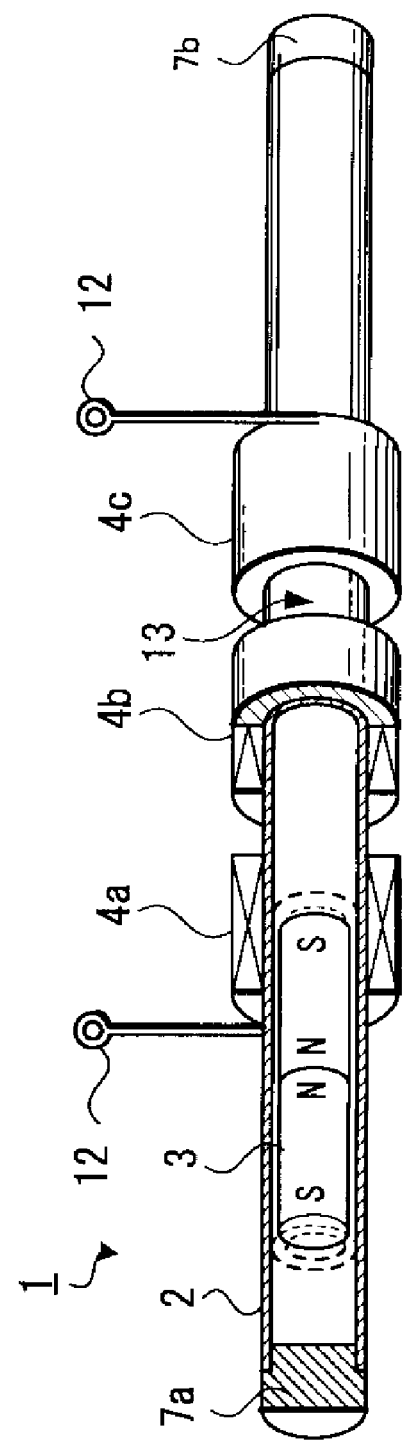

FIGS. 12A and 12B show an exterior constitution example of the vibration type electromagnetic generator 1.

FIG. 12A is a perspective view in a state in which respective components constituting the vibration type electromagnetic generator 1 are shown in an exploded manner.

FIG. 12B is a partial perspective view when partially seeing through the first pipe 2 within the vibration type electromagnetic generator 1 in which the respective components are combined.

The solenoid coils 4a to 4c are wound at predetermined coil intervals around the outer circumferential surface of the first pipe 2 which has a cylindrical shape and houses the movable magnet 3. The solenoid coils 4a to 4c are connected in series. Then, the respective solenoid coils are wound around in opposite directions to one another and are made to be of forward winding, reverse winding and forward winding respectively.

Coil end terminals 12 are pulled out from the solenoid coil 4a and the solenoid coil 4c respectively and are connected to an external load which is not shown.

In order for the movable magnet 3 to be housed inside the first pipe 2, end-portion members 7a, 7b are attached to both ends of the first pipe 2.

The movable magnet 3 moves smoothly inside the first pipe 2, so that it moves in the winding axis direction inside the solenoid coils 4a to 4c. Thus, the solenoid coils 4a to 4c generate voltages and function as an electric power generator.

In the vibration type electromagnetic generator 1 relating to the first exemplified embodiment, which was explained above, the coil length of one or more solenoid coils is made to be a length equal to or greater than the magnet length of the magnet. Thus, there is such an effect that it is possible to enlarge the range in which the magnetic field generated by the magnet passes through the solenoid coils and to make the phases of the voltages outputted by the solenoid coils coincide with one another, and it is possible to heighten the output voltage of the vibration type electromagnetic generator 1.

Also, the movable magnet 3 is provided with a plurality of magnets (magnets 3a, 3b) which are arranged such that the facing magnetic poles thereof are the same magnetic poles. Those plurality of magnets have such a simple constitution that they are inserted into the second pipe 5, so that there is such an effect that the assembly of the movable magnet 3 is very easy.

Also, a formation process of the movable magnet 3 only requires a simple operation of inserting the magnets 3a, 3b along the inner wall surface of the second pipe 5. Then, the plurality of magnets inserted into the second pipe 5 and the magnet end members are forcibly aligned, so that the outer circumferential surface of the movable magnet 3 does not warp. Thus, when the movable magnet 3 vibrates, unnecessary friction resistance occurring between the movable magnet 3 and the inner wall surface of the first pipe 2 is suppressed. As a result of this, there is such an effect that the vibration type electromagnetic generator 1 excellent in power generation efficiency can be realized.

Also, since the plurality of the magnets are arranged in such a manner that the same magnetic poles thereof face one another, the magnetic flux distribution of magnetic flux interlinking with the magneto coil 9 becomes large rapidly. As a result of this, there is such an effect that the power generation efficiency of the vibration type electromagnetic generator 1 heightens. Also, in a case in which the second pipe 5 is constituted by a resin material, it is possible to employ, as a sealing process, a fusion process by heating or solvent. Thus, there is such an effect that the manufacture of the movable magnet 3 can be made easy.

Also, the outer circumferential diameter of the magnet is made slightly smaller than the inner circumferential diameter of the second pipe 5. When doing so, the air is not compressed inside the second pipe 5 in case of assembling the movable magnet 3 by using the movable magnet assembling apparatus 20, and there is no resisting force occurring with respect to the press-down force of the press rod 24. Alternatively, compressed air is allowed to be let out by forming a groove or the like in the magnet.

Second Exemplified Embodiment

Next, there will be explained a constitution example of a vibration type electromagnetic generator 40 relating to a second exemplified embodiment of the present invention with reference to FIG. 13. It should be noted in FIG. 13 that the same reference numerals are applied to portions corresponding to those in FIG. 1 already explained, and detailed explanation thereof will be omitted.

Figure 13:
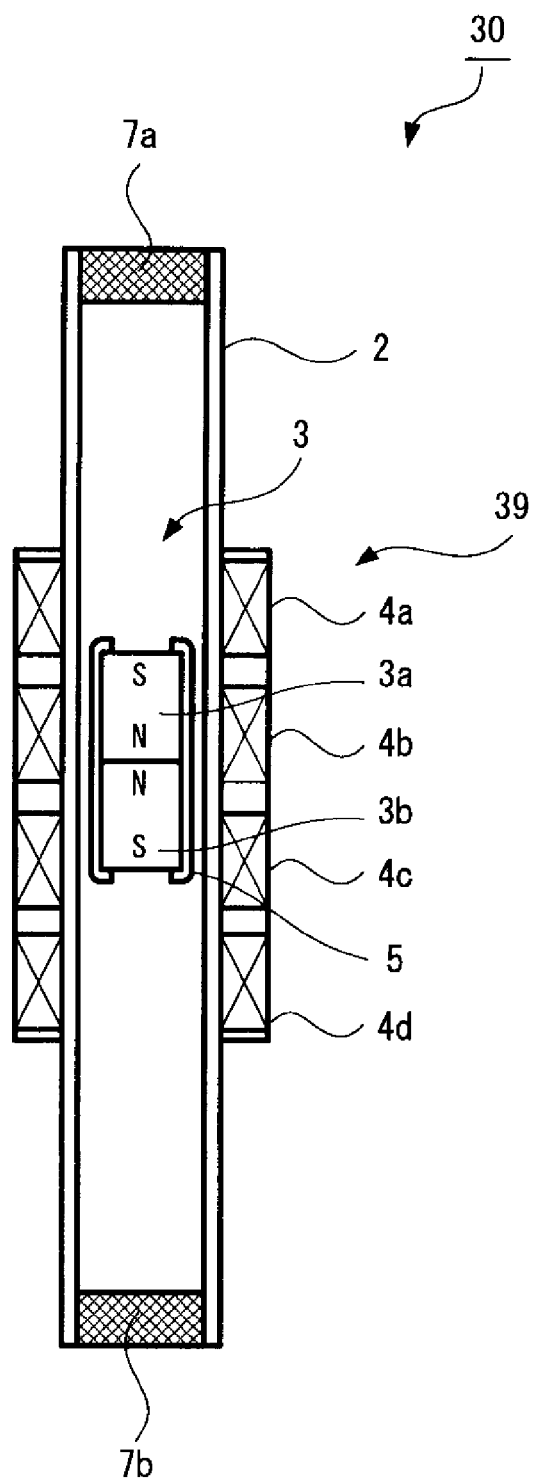
FIG. 13 is a cross-sectional view showing a constitution example of a vibration type electromagnetic generator relating to a second exemplified embodiment of the present invention.

FIG. 13 shows a constitution example of a vibration type electromagnetic generator 30 provided with four solenoid coils and two magnets.

The vibration type electromagnetic generator 30 is provided with a movable magnet 3 composed of two magnets 3a, 3b connected with each other, and four solenoid coils 4a to 4d. The four solenoid coils 4a to 4d are referred to also as magneto coil 39.

Figure 14:
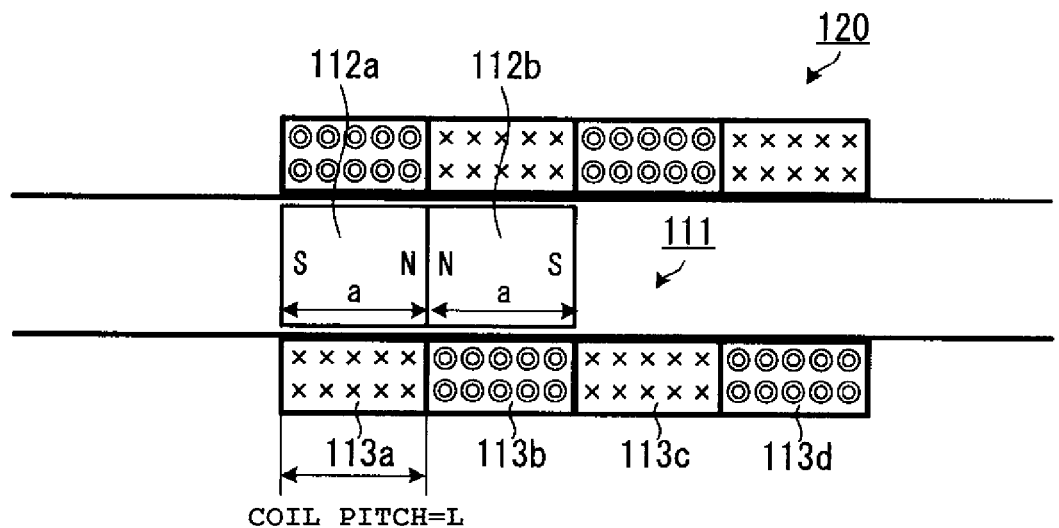

FIG. 14 shows a constitution example of a vibration type electromagnetic generator 120 in the past provided with four solenoid coils and two magnets. Hereinafter, the vibration type electromagnetic generator 120 which is made to have such a constitution is referred to also as "comparative example 2".

The vibration type electromagnetic generator 120 in the past is provided with a movable magnet 111 composed of two magnets 112a, 112b connected with each other, and four solenoid coils 113a to 113d. In case of expressing the coil pitch of the solenoid coils 113a to 113d as $\underline{L}$ and expressing the magnet length as $\underline{a}$, a relation of L=a is satisfied.

Figure 15:
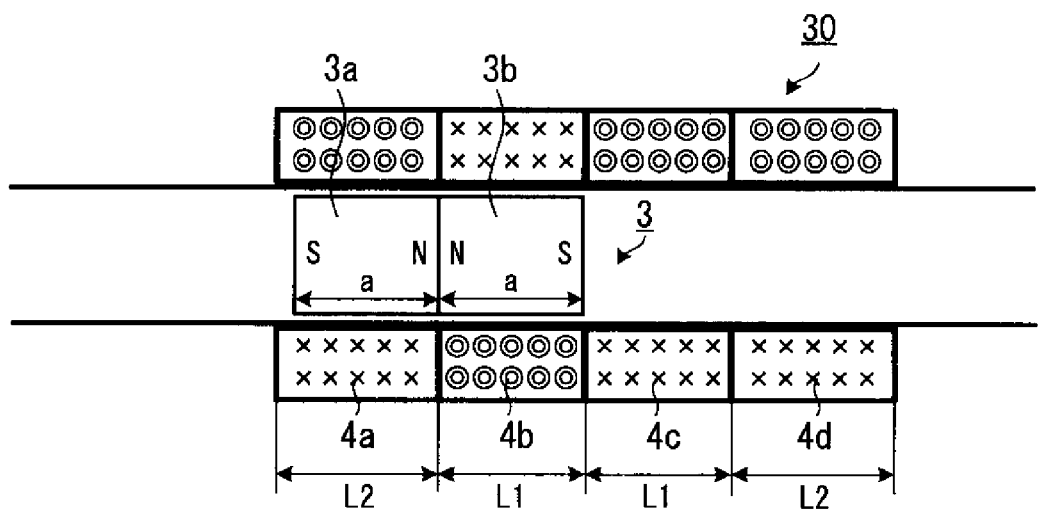

FIG. 15 shows a constitution example of the vibration type electromagnetic generator 30 relating to the present invention, which is provided with four solenoid coils and two magnets. Hereinafter, the vibration type electromagnetic generator 30 which is made to have such a constitution is referred to also as "inventive example 4".

The vibration type electromagnetic generator 30 relating to the inventive example 4 is provided with a movable magnet 3 composed of two magnets 3a, 3b, and four solenoid coils 4a to 4d as mentioned above. Then, in case of expressing the coil pitch of the solenoid coils 4a, 4d arranged at both end portions as L2, expressing the coil pitch of the solenoid coils 4b, 4c arranged in the center as L1 and expressing the magnet length as $\underline{a}$, relations of L1=a and $1.05a \leq L2 \leq 1.50a$ are satisfied.

Here, the inventors measured the voltages outputted for coil pitch ratios of five patterns in order to find out the most suitable coil pitch for the vibration type electromagnetic generator 30, which is shown in the inventive example 4, with respect to the vibration type electromagnetic generator 120 relating to the comparative example 2. Then, in a case in which the effective value of the voltage outputted by the vibration type electromagnetic generator 120 shown in the comparative example 2 was set as a reference value, the ratio between the effective values of the voltages outputted by the vibration type electromagnetic generator 30 whose coil pitch ratio was changed according to the patterns was worked out as the effective value output voltage mark-up percentage. This measurement result is shown in Table 4.

TABLE 4

| Examples | Coil Pitch Ratio: Coil Length/Size of Magnet Length | Effective Value Output Voltage Mark-up Percentage | Judgment |
|---|---|---|---|
| Comparative Example 2 | 1.00 | 0.0% | — |
| Inventive example 4-1 | 1.05 | 5.4% | ○ |
| Inventive example 4-2 | 1.30 | 18.2% | ○ |
| Inventive example 4-3 | 1.40 | 13.5% | ○ |
| Inventive example 4-4 | 1.50 | 5.0% | ○ |
| Inventive example 4-5 | 1.60 | −10.0% | X |

As shown in Table 4, it is shown that, in a case in which the coil pitch ratio is set in the range of 1.05 to 1.50, the effective value of the voltage outputted by the vibration type electromagnetic generator 30 increases. Thus, if the coil pitch ratio is set within the range of 1.05 to 1.50, the vibration type electromagnetic generator 30 outputs a high voltage.

According to the vibration type electromagnetic generator 30 relating to the second exemplified embodiment explained above, the coil pitch of the solenoid coils 4a, 4d arranged at both end portions is made greater than the magnet length of the magnets 3a, 3b, whereby there is such an effect that the voltage outputted by the vibration type electromagnetic generator 30 heightens.

Third Exemplified Embodiment

Next, there will be explained a constitution example of a vibration type electromagnetic generator 40 relating to a third exemplified embodiment of the present invention with reference to FIGS. 16 to 19. It should be noted in FIG. 16 that the same reference numerals are applied to portions corresponding to those in FIG. 1 already explained, and detailed explanation thereof will be omitted.

Figure 16:
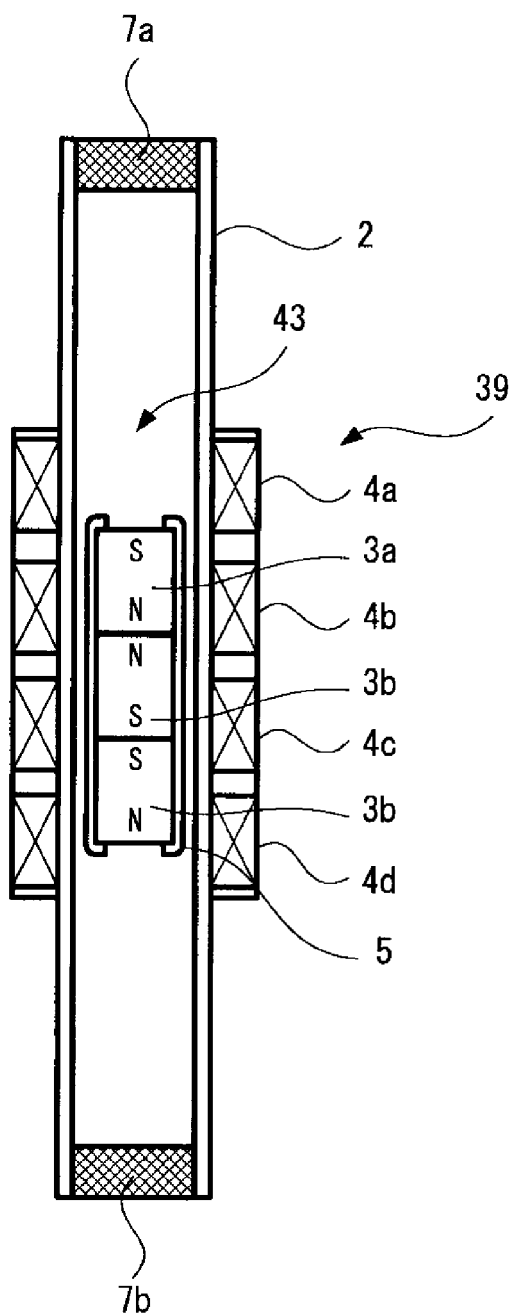
FIG. 16 is a cross-sectional view showing a constitution example of a vibration type electromagnetic generator relating to a third exemplified embodiment of the present invention.

FIG. 16 shows a constitution example of the vibration type electromagnetic generator 40 including four solenoid coils and three magnets.

The vibration type electromagnetic generator 40 is provided with a movable magnet 43 composed of three magnets 3a to 3c connected with one another, and a magneto coil 39 composed of four solenoid coils 4a to 4d.

Here, regarding the vibration type electromagnetic generator 40, the length of the solenoid coils arranged at both end portions of the magneto coil 39 is made greater than the magnet length.

More specifically, regarding the vibration type electromagnetic generator 40, the long-axis size of the magnets arranged at both end portions of the movable magnet 3 is made to be a length between 0.70 times or more and 0.95 times or less, preferably between 0.80 times or more and 0.92 times or less, with respect to the pitch of a plurality of coils, and the long-axis size of the magnet arranged at the portion other than both the end portions of the movable magnet 3 is made equal to the coil pitch. Hereinafter, comparisons are made in terms of constitution and output voltage between the vibration type electromagnetic generator 130 in the past and the vibration type electromagnetic generator 40 relating to this exemplified embodiment.

Figure 17:
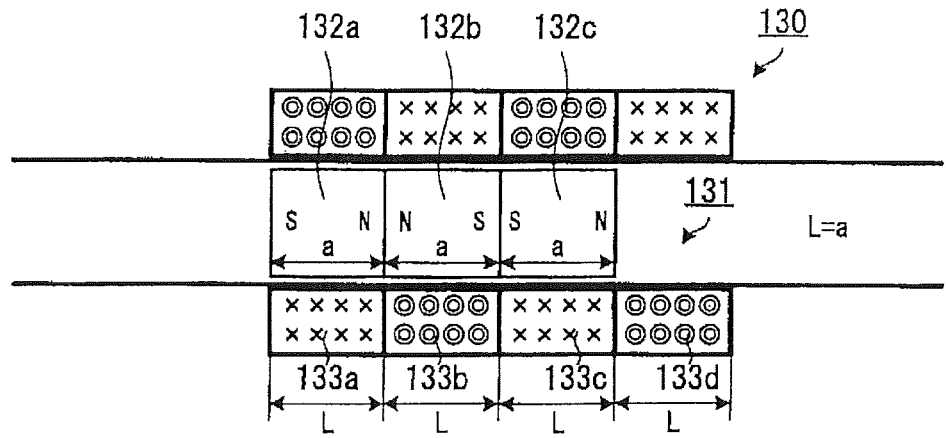

FIG. 17 shows a constitution example of the vibration type electromagnetic generator 130 in the past including four solenoid coils and three magnets. Hereinafter, the vibration type electromagnetic generator 130 which is made to have such a constitution is referred to also as "comparative example 3".

The vibration type electromagnetic generator 130 in the past is provided with a movable magnet 131 composed of three magnets 132a to 132c connected with one another, and four solenoid coils 133a to 133d. The length $L$ of each of the solenoid coils 133a to 133d in the winding shaft direction is equal to the length $a$ of the magnets 132a, 132b, 132c in the long-axis direction. In other word, a relation of $L=a$ is satisfied.

Figure 18:
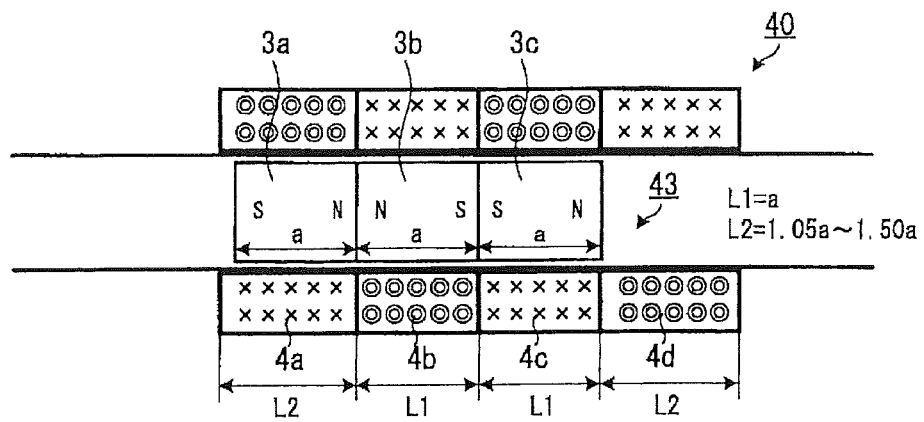

FIG. 18 shows a constitution example of the vibration type electromagnetic generator 40 relating to the present invention including four solenoid coils and three magnets. Hereinafter, the vibration type electromagnetic generator 40 which is made to have such a constitution is referred to also as "inventive example 5".

In the vibration type electromagnetic generator 40 relating to the inventive example 5, the magnet length of the magnets 3a to 3c is expressed as $a$, the coil pitch of the solenoid coils 4b, 4c is expressed as L1, and the coil pitch of the solenoid coils 4a, 4d is expressed as L2. At that time, the coil pitches and the magnet length are adjusted so as to satisfy relations of $L1=a$ and $1.05a \leq L2 \leq 1.50a$.

Figure 19:
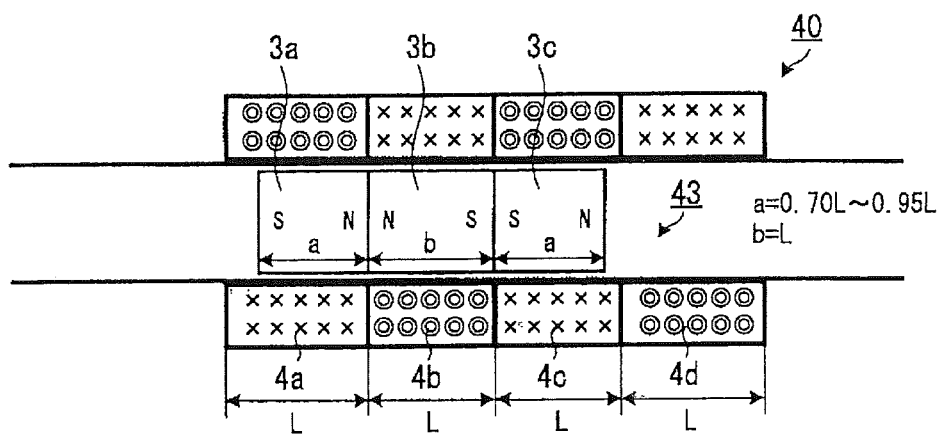

FIG. 19 shows a constitution example of the vibration type electromagnetic generator 40 relating to the present invention including four solenoid coils and three magnets. Hereinafter, the vibration type electromagnetic generator 40 which is made to have such a constitution is referred to also as "inventive example 6".

In the vibration type electromagnetic generator 40 relating to the inventive example 6, the magnet length of the magnets 3a, 3c is expressed as $a$ and the magnet length of the magnet 3b is expressed as $b$. Also, the coil pitch of the solenoid coils 4a to 4d is expressed as $L$. At that time, the coil pitch and the magnet lengths are adjusted so as to satisfy relations of $0.70L \leq a \leq 0.95L$ and $b=L$.

Here, the inventors measured the voltages outputted for magnet pitch ratios (long-axis size of magnets arranged at both end portions/coil pitch) of five patterns in order to find out the most suitable magnet pitch for the vibration type electromagnetic generator 40 shown in the inventive example 5 with respect to the vibration type electromagnetic generator 130 relating to the comparative example 3. Then, in a case in which the effective value of the voltage outputted by the vibration type electromagnetic generator 130 shown in the comparative example 3 was set as a reference value, the ratio between the effective values of the voltages outputted by the vibration type electromagnetic generator 40 whose magnet pitch ratio was changed according to the patterns was worked out as the effective value output voltage mark-up percentage. This measurement result is shown in Table 5.

TABLE 5

| Examples | Coil Pitch Ratio: Coil Length/Size of Magnet Length | Effective Value Output Voltage Mark-up Percentage | Judgment |
|---|---|---|---|
| Comparative Example 3 | 1.00 | 0.0% | — |
| Inventive example 5-1 | 1.05 | 5.9% | Δ |
| Inventive example 5-2 | 1.30 | 19.9% | ◯ |
| Inventive example 5-3 | 1.40 | 15.5% | ◯ |
| Inventive example 5-4 | 1.50 | 5.6% | ◯ |
| Inventive example 5-5 | 1.60 | −8.4% | X |

As shown in Table 5, it is shown that, in a case in which the magnet pitch ratio is set in the range of 1.05 to 1.50, desirably in the range of 1.30 to 1.50, the effective value of the voltage outputted by the vibration type electromagnetic generator 40 increases. Thus, when the magnet pitch ratio is set within the range of 1.05 to 1.50, the vibration type electromagnetic generator 40 outputs a high voltage.

Similarly, the inventors measured the voltage values outputted for magnet pitch ratios of nine patterns in order to find out the most suitable magnet pitch for the vibration type electromagnetic generator 40 relating to the inventive example 6.

TABLE 6

| Examples | Coil Pitch Ratio: Coil Length/Size of Magnet Length | Effective Value Output Voltage Mark-up Percentage | Judgment |
|---|---|---|---|
| Comparative Example 3 | 1.00 | 0.0% | — |
| Inventive example 6-1 | 1.97 | 3.2% | Δ |
| Inventive example 6-2 | 0.95 | 7.3% | ◯ |
| Inventive example 6-3 | 0.92 | 18.3% | ◯ |
| Inventive example 6-4 | 0.90 | 21.5% | ◯ |
| Inventive example 6-5 | 0.80 | 19.9% | ◯ |
| Inventive example 6-6 | 0.70 | 9.9 | ◯ |
| Inventive example 6-7 | 0.68 | 2.2 | Δ |
| Inventive example 6-8 | 0.66 | 0.1 | X |
| Inventive example 6-9 | 0.60 | −9.8 | X |

As shown in Table 6, regarding the vibration type electromagnetic generator 40 relating to the inventive example 6, it is shown that, in a case in which the magnet pitch ratio is set in the range of 0.68 to 0.97, desirably in the range of 0.70 to 0.95, the effective value of the voltage outputted by the vibration type electromagnetic generator 40 increases.

According to the vibration type electromagnetic generator 40 relating to the third exemplified embodiment explained above, the coil pitch of the solenoid coils 4a, 4d arranged at both end portions is made greater than the magnet length of the magnets 3a, 3b, whereby there is such an effect that the voltage outputted by the vibration type electromagnetic generator 40 heightens.

Fourth Exemplified Embodiment

Figure 20:
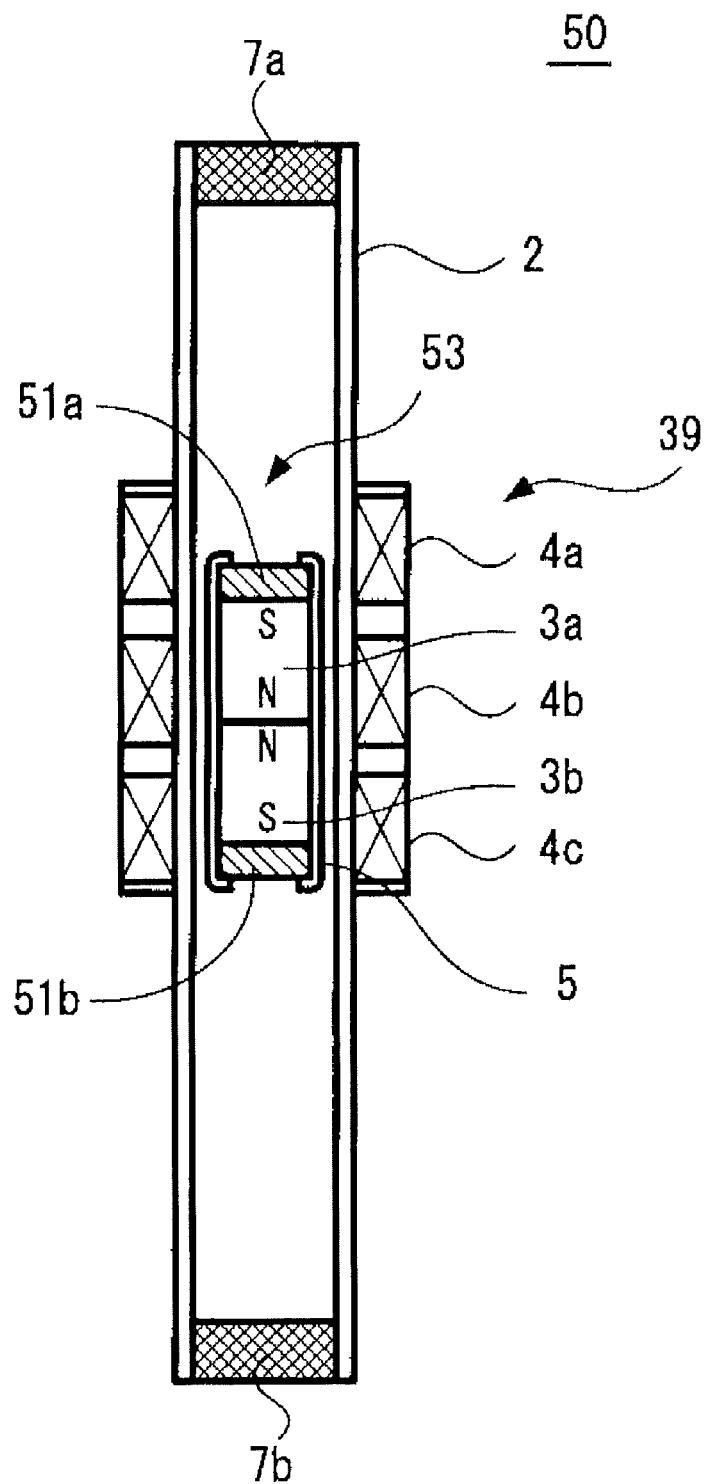
FIG. 20 is a cross-sectional view showing a constitution example of a vibration type electromagnetic generator relating to a fourth exemplified embodiment of the present invention.

Next, there will be explained a constitution example of a vibration type electromagnetic generator 50 relating to a fourth exemplified embodiment of the present invention with reference to FIG. 20 and FIG. 21. It should be noted in FIG. 20 and FIG. 21 that the same reference numerals are applied to portions corresponding to those in FIG. 1 and FIG. 13 already explained, and detailed explanation thereof will be omitted.

The constitution of the vibration type electromagnetic generator 50 is approximately the same as the constitution of the vibration type electromagnetic generator 1 mentioned above, but the constitution of a movable magnet 53 is different from that of the movable magnet 3. The movable magnet 53 is provided with magnet end members 51a, 51b composed of nonmagnetic body material in order to protect the magnets 3a, 3b arranged in the second pipe 5.

The magnet end members 51a, 51b are formed by a thermoplastic resin or a thermosetting resin in order to seal both end portions of the second pipe 5 reliably. The magnet end members 51a, 51b are joined with the second pipe 5 by thermal fusion as mentioned later, so that it is desirable for these to have the same material properties. It should be noted that the second pipe 5 and the magnet end members 51a, 51b are allowed to be bonded and fixed together by using an adhesive agent or the like. However, supposing that an adhesive agent having good adhesive properties is to be used, it is not necessary to equalize the material properties between the second pipe 5 and the magnet end members 51a, 51b.

Figure 21:
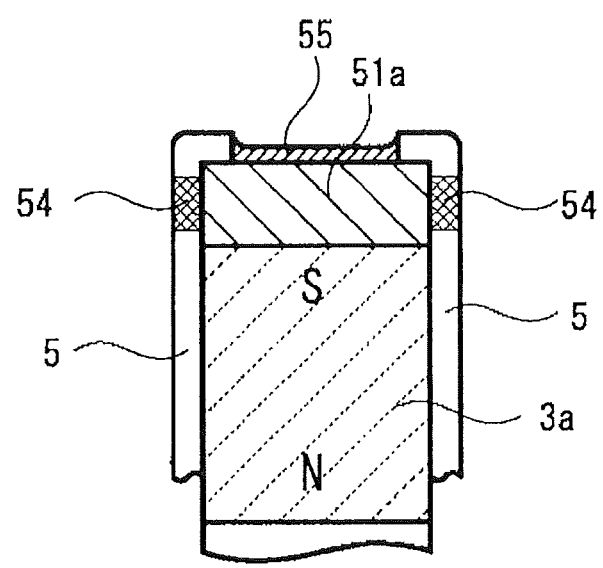
FIG. 21 is a cross-sectional view showing a constitution example of an end portion of a movable magnet relating to the fourth exemplified embodiment of the present invention.

FIG. 21 is an enlarged view showing the vicinity of the magnet end member 51a mounted on the movable magnet 3.

In the process for sealing the magnets 3a, 3b in the second pipe 5, heat is applied to both end portions of the second pipe 5. In this process, the magnet end member 51a formed by a thermoplastic resin is arranged at an end portion of the second pipe 5. When heat is applied to the end portion of the second pipe 5, the magnet end member 51a and the end portion of the second pipe 5 fuse thermally, and a thermal fusion portion 54 is formed. Usually, in this process, when heat is applied to the magnets 3a, 3b, there is noticeable degradation of magnetic characteristics. For this reason, when the magnet end member 51a is provided at the end portion of the second pipe 5, it becomes difficult for heat to be transmitted to the magnets 3a, 3b. In other words, it can be said that the constitution in which the magnet end member 51a is arranged at the end portion of the second pipe 5 is a desirable configuration in case of carrying out the sealing process by a heating means.

Also, in the process for sealing the magnets 3a, 3b in the second pipe 5, an adhesive agent 55 is used for both end portions of the movable magnet 3. As the adhesive agent 55, an adhesive agent is used which exhibits a sufficient adhesive property with respect to the resin to be used. The adhesive agent 55 used for both the end portions of the movable magnet 3 permeates to the joint surface between the second pipe 5 and the magnet end member 51a. Then, the second pipe 5 and the magnet end member 51a are firmly coupled.

Also, in a case in which a thermosetting resin or a nonmagnetic metal is used as the material of the second pipe 5 and the magnet end member 51a, it is necessary to bond and fix the second pipe 5 and the magnet end member 51a together sufficiently by using an organic adhesive agent or the like. For this purpose, it is desirable to devise the size and shape of the gap between the second pipe 5 and the magnet end member 51a such that the adhesive agent will flow into the gap sufficiently.

It should be noted that also regarding the vicinity of the magnet end member 51b of the movable magnet 3, there is employed a constitution similar to that of the magnet end member 51a, so that detailed explanation will be omitted with respect to a constitution example in the vicinity of the magnet end member 51b.

According to the vibration type electromagnetic generator 50 relating to the fourth exemplified embodiment explained above, the magnets 3a, 3b are sealed inside the second pipe 5 and fixed by an adhesive agent or the like, and the strength thereof improves as well. Thus, even if shock is applied to the movable magnet 3 by the vibration at the time of electric power generation, the risk that the movable magnet is damaged becomes small.

Also, the magnet end members 51a, 51b are arranged at both the end portions of the movable magnet 3. Then, as the material of the second pipe 5, a nonmagnetic metal is used which is represented, for example, by aluminum, copper, brass or the like. In this case, a plurality of magnets are inserted into the second pipe 5 and thereafter, both the end portions of the second pipe 5 are sealed by a caulking process. When using such a manufacturing method, there occurs only a phenomenon in which the magnet end members 51a, 51b deform and it never happens that unnecessary stress is applied to end portions of the plurality of magnets, deformation occurs, and so forth. Also, heat is not applied to the plurality of magnets, so that degradation of the magnets can be suppressed. As a result of this, there is such an effect that deviation in the densities of magnetic fluxes which the plurality of magnets generate can be reduced. However, if the caulking process method is optimized and a situation is made in which excessive stress is not applied to the magnets, the magnet end members 51a, 51b are not necessarily indispensable constituents.

It should be noted that there was explained a case in which thermoplastic resins were used as the materials of the second pipe 5, the magnet end member 51a and the magnet end member 51b, which were formed of nonmagnetic body materials, and in which they were joined together by thermal fusion. However, even in case of using a thermosetting resin as the nonmagnetic body material, use of a fixing means by an adhesive agent makes it possible to manufacture the movable magnet 3 by approximately the same manufacturing method as that of the first exemplified embodiment mentioned above. Also, without bonding the second pipe 5 and the magnet end members 51a, 51b by using an adhesive agent, it is allowed for the magnet end members 51a, 51b to be screwed and fixed to the second pipe 5 by a configuration in which screws are cut into the inner wall surface of the second pipe 5 and into the magnet end members 51a, 51b beforehand.

Fifth Exemplified Embodiment

Figure 22:
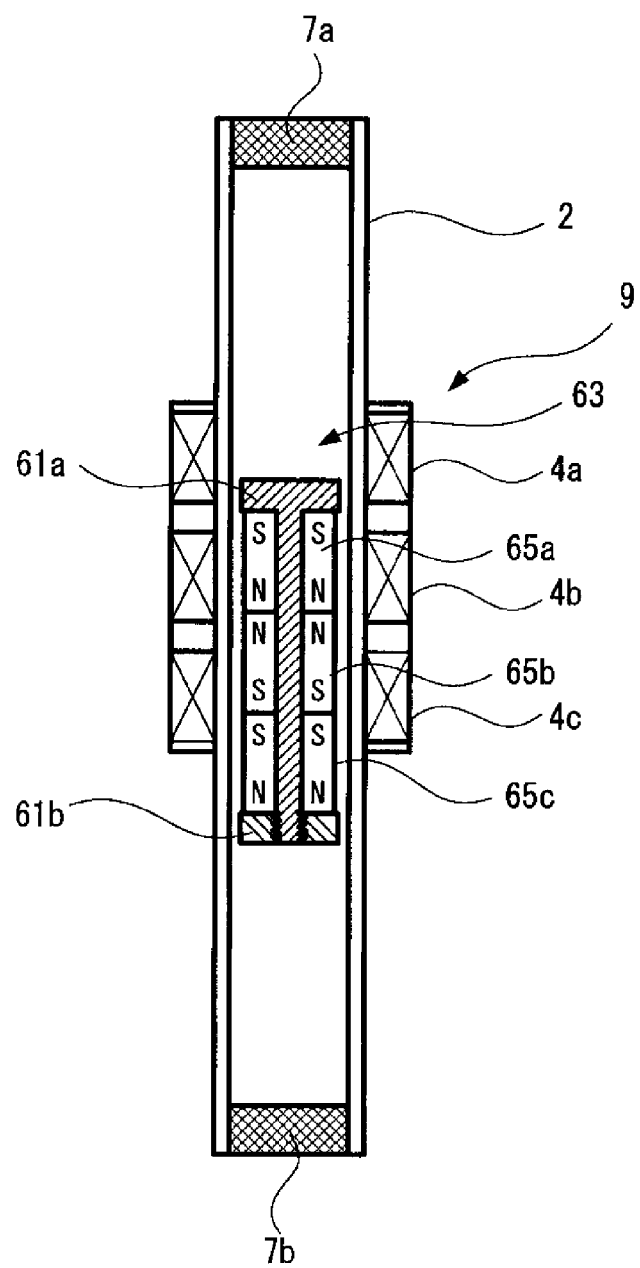
FIG. 22 is a cross-sectional view showing a constitution example of a vibration type electromagnetic generator relating to a fifth exemplified embodiment of the present invention.
Figure 23:
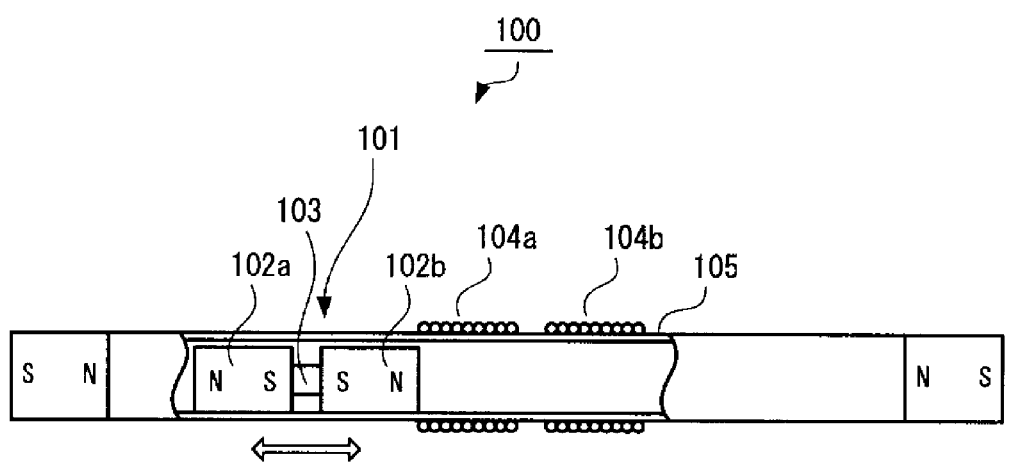
FIG. 23 is a constitution view showing an example of a vibration type electromagnetic generator in the past.

Next, there will be explained a constitution example of a vibration type electromagnetic generator 60 relating to a fifth exemplified embodiment of the present invention with reference to FIG. 22. It should be noted in FIG. 22 that the same reference numerals are applied to portions corresponding to those in FIG. 1 already explained, and detailed explanation thereof will be omitted.

A movable magnet 63 is constituted such that ring shaped magnets 65a to 65c, in which the same magnetic poles face one another and through-holes are formed at central portions thereof, are sandwiched and fixed by magnet fixing units 61a, 61b composed of nonmagnetic bodies.

The magnet fixing unit 61a is, for example, a bolt. The magnet fixing unit 61b is, for example, a nut. For the magnet fixing units 61a, 61b, there are formed flange portions whose side surfaces are processed into circular or polygonal shapes.

The magnet fixing unit 61a includes a core portion which is inserted into the through-holes of the magnets 65a to 65c and the flange portion, and the core portion and the flange portion are formed integrally. The core portion is positioned on the center axis of the first pipe 2 and is formed to have a width which is approximately equal to or slightly narrower than the diameter of the through-holes of the magnets 65a to 65c. At the upper side (tip portion) of the core portion, there is fabricated & formed a male screw (male portion) for fixing the magnet fixing unit 61b. At a central portion of the magnet fixing unit 61b, there is fabricated & formed a female screw (female portion), that is, a connection hole to which the tip of the core portion is connected. Then, the ring shaped magnets 65a to 65c, whose same magnetic poles face one another and repel one another, are sandwiched and fixed by the magnet fixing unit 61b so as not to detach from the core portion.

At that time, as another modified example having an effect equivalent to the male screw and the female screw mentioned above, there can be cited, for example, a constitution in which the core portion of the magnet fixing unit 61a is made to have a tip-split form, also a tip portion thereof is made a hook-shaped portion (male-shaped portion) and the magnet fixing unit 61b is provided with a hole portion (female-shaped portion) for fitting aforesaid hook-shaped portion through. In case of employing such a constitution, it is possible to fix the magnets by the fitting each other. Thus, there is included such an advantage therein that the assembly of the movable magnet becomes easy compared with the constitution of the male screw & the female screw mentioned above.

The flange portion of the magnet fixing unit 61a has a width greater than the width of the magnets 65a to 65c with respect to the center axis of the first pipe 2. The flange portion of the magnet fixing unit 61b has a width greater than the width of the magnets 65a to 65c with respect to the center axis of the first pipe 2. At that time, it is desirable for the shapes and dimensions of the flange portion of the magnet fixing unit 61a and of the flange portion of the magnet fixing unit 61b to be identical.

As suitable materials for the magnet fixing unit 61b (nut) and the magnet fixing unit 61a (bolt), there can be cited polyacetal-based raw materials regarding resins, and aluminum and the like as metals.

It should be noted that, as the material of the magnet fixing unit 61b (nut) and the magnet fixing unit 61a (bolt), it is allowed to use a polytetrafluoroethylene-based raw material. This raw material has a very low friction coefficient and is therefore superior in the slidability of the movable magnet 63. However, in case of screwing the magnet fixing unit 61a to the magnet fixing unit 61b, there sometimes occurs a case in which friction cannot be maintained. Thus, after fixing the magnets by using the magnet fixing units 61a, 61b, it is desirable to prevent the magnet fixing units 61a, 61b from loosening by applying a crushing process to the tip of the magnet fixing unit 61a (bolt), by employing a configuration in which after constituting the tip of the core portion of the magnet fixing unit 61b to be a hook-shaped portion and forming a hole portion in the magnet fixing unit 61a, they are fitted together, and so forth.

The vibration type electromagnetic generator 50 relating to the fifth exemplified embodiment explained above is provided with the movable magnet 63 in which three magnets 65a to 65c whose same magnetic poles face one another are fixed by the magnet fixing units 61a, 61b. Also, both end portions of the movable magnet 63 are protected by the flange portions of the magnet fixing units 61a, 61b, so that shock will not be transmitted thereto directly even if they come into contact with the end portion members 7a, 7b. Thus, even in a case in which the vibration type electromagnetic generator 50 is vibrated for long hours, the magnets 65a to 65c will not be damaged.

The contact between the movable magnet 63 and the inner circumferential surface of the first pipe 2 is only the contact between the flange portion and the side circumferential surface of the magnet fixing unit 61b. Thus, there is such an advantage that the friction between the movable magnet 63 and the first pipe 2 becomes small and the slidability of the movable magnet 63 improves.

It should be noted that according to the vibration type electromagnetic generator relating to the first to fifth exemplified embodiments mentioned above, the movable magnet is made movable inside the first pipe 2 and it is allowed herein to install at least one coil spring (extension spring) inside the first pipe 2 in order to support the movable magnet. In this case, it is enough if the coil spring is installed in the gravitational direction (upper side) of the movable magnet.

Also, it is allowed to use two compression springs as elastic bodies. Even if the compression springs are used, it is possible to support both end portions of the movable magnet vibratably in the winding shaft direction of the magneto coil. Further, it is allowed to use a single compression spring. In this case, it is enough if the compression spring is installed in the gravitational direction (lower side) of the movable magnet. Even if there is employed such a constitution, it is possible to carry out electric power generation suitably.

In this case, it is possible to convert weak vibration energy to a linear reciprocating motion of the movable magnet efficiently. Thus, in a case in which the vibration type electromagnetic generator lies in a parallel state with respect to the gravitational direction and also, the installation direction of the vibration type electromagnetic generator is constant, it can be said that the generator is suitable for an electric power generator such as, for example, a light-emitting buoy which generates electricity by the upward and downward motion of the waves and emits light for safe navigation of marine vessels. In addition, it is also possible to employ the generator for a luggage-carrier or a saddle of a bicycle or for a suspension portion or the like of an automobile.

Also, in the exemplified embodiments mentioned above, the same magnetic poles of adjacent magnets, among a plurality of magnets constituting a movable magnet, are arranged so as to face each other, but it is allowed to arrange opposite magnetic poles so as to face each other. Also, it is allowed for the number of magnets to be more than the number of solenoid coils.

DESCRIPTION OF REFERENCE NUMERALS

1: vibration type electromagnetic generator; 2: first pipe; 3: movable magnet 3a, 3b: magnet; 4a to 4c: solenoid coil; 5: second pipe; 7a, 7b: end portion member; 9: magneto coil; 12: coil end portion; 20: movable magnet assembling apparatus; 30: vibration type electromagnetic generator; 39: magneto coil; 40: vibration type electromagnetic generator; 43: movable magnet; 50: vibration type electromagnetic generator; 51a, 51b: magnet end member; 53: movable magnet; 60: vibration type electromagnetic generator; 61a, 61b: magnet fixing unit; 63: movable magnet; 65a, 65b: magnet

The invention claimed is:

1. A vibration type electromagnetic generator comprising:
a hollow first pipe formed by a nonmagnetic material, wherein both end portions of the hollow first pipe are closed;
a magneto coil wound around the periphery of the first pipe and provided with at least one solenoid coil; and
a movable magnet arranged inside the first pipe and movable along the winding axis direction of the magneto coil, wherein
the movable magnet comprises:
a plurality of magnets; and
a magnet fixing unit composed of a nonmagnetic body for fixing the plurality of magnets such that same magnetic poles of the plurality of magnets are facing, and
magnets at ends of the plurality of magnets have a length smaller than that of a magnet not located at the ends; and
lengths of the magnets at the ends of the plurality of magnets are between 0.70 times or more and 0.95 times or less lengths of the magnet not located at the ends.

2. The vibration type electromagnetic generator according to claim 1, wherein the coil length of the solenoid coil is made to be a length between 1.05 times or more and 1.50 times or less with respect to the magnet length of the magnet.

3. The vibration type electromagnetic generator according to claim 1, wherein the magnet lengths of the magnets arranged at both end portions of the magnet fixing unit are made to be lengths between 0.70 times or more and 0.95 times or less the coil length of the solenoid coil.

4. The vibration type electromagnetic generator according to claim 1, wherein the magnet fixing unit is a hollow second pipe and the plurality of magnets are sealed inside the second pipe.

* * * * *